US010061985B2

(12) United States Patent
Paluri et al.

(10) Patent No.: US 10,061,985 B2
(45) Date of Patent: Aug. 28, 2018

(54) VIDEO UNDERSTANDING PLATFORM (71) Applicant: Facebook, Inc., Menlo Park, CA (US)

(72) Inventors: Balmanohar Paluri, Mountain View, CA (US); Benoit F. Dumoulin, Palo Alto, CA (US); Merlyn Deng, Palo Alto, CA (US); Reena Philip, Saratoga, CA (US); Dario Garcia Garcia, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 64 days.

(21) Appl. No.: 15/395,511

(22) Filed: Dec. 30, 2016

(65) Prior Publication Data

US 2018/0189570 A1   Jul. 5, 2018

(51) Int. Cl.

| G06K 9/46 | (2006.01) |
|---|---|
| G06K 9/00 | (2006.01) |
| H04L 12/26 | (2006.01) |
| G06K 9/62 | (2006.01) |
| H04N 21/44 | (2011.01) |
| H04N 21/439 | (2011.01) |
| H04N 21/4788 | (2011.01) |
| H04N 21/258 | (2011.01) |
| H04N 21/45 | (2011.01) |
| H04N 21/482 | (2011.01) |
| H04N 21/84 | (2011.01) |
| H04L 29/08 | (2006.01) |

(52) U.S. Cl.

CPC ..... *G06K 9/00744* (2013.01); *G06K 9/00718* (2013.01); *G06K 9/4604* (2013.01); *G06K 9/623* (2013.01); *H04L 43/045* (2013.01); *H04N 21/25891* (2013.01); *H04N 21/4394* (2013.01); *H04N 21/44008* (2013.01); *H04N 21/4532* (2013.01); *H04N 21/4788* (2013.01); *H04N 21/4826* (2013.01); *H04N 21/84* (2013.01); *H04L 67/306* (2013.01)

(58) Field of Classification Search
None
See application file for complete search history.

(56) References Cited

U.S. PATENT DOCUMENTS

2005/0022252 A1 * 1/2005 Shen ................. G06F 17/30017
725/135

OTHER PUBLICATIONS

Patel, "Video classification using speaker identification" SPIE 1997.*

* cited by examiner

*Primary Examiner* — Mark Roz
(74) *Attorney, Agent, or Firm* — Baker Botts L.L.P.

(57) ABSTRACT

In one embodiment, a method includes accessing a first feature vector representing a video-content object corresponding to a node in a social graph, wherein the video-content object comprises frames and audio and is associated with text, the first feature vector is based on one or more of the frames; accessing a second feature vector representing the video-content object, wherein the second feature vector is based on at least some of the text; accessing a third feature vector representing the video-content object, wherein the third feature vector is based on one or more portions of the audio; determining a fourth feature vector representing the video-content object, wherein the fourth feature vector is based on a combination of the first, second, and third feature vectors; and determining a context of the video-content object based on the fourth feature vector and social-graph information.

20 Claims, 6 Drawing Sheets

VIDEO UNDERSTANDING PLATFORM

TECHNICAL FIELD

This disclosure generally relates to computer vision.

BACKGROUND

Computer vision is a computational process (or set of computational processes) that facilitates machine understanding of the content of an image or set of images, such as a video. For example, computer vision may involve automatically extracting features from an image, analyzing them, and generating an explicit description or categorization of the image. Applications of computer vision include controlling processes and systems, navigation, event detection, organizing information, modeling objects or environments, and automatic inspection.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

SUMMARY OF PARTICULAR EMBODIMENTS

In particular embodiments, a video understanding platform may be trained by machine learning to make a prediction about a video-content object based on one or more of: frames of the video-content object, audio of the video-content object, and text associated with the video-content object. In particular embodiments, a video understanding platform may comprise a video-recognition model, an audio-recognition model, and a text-recognition model. A video-recognition model may be trained by machine learning to make a prediction about a video-content object based on an analysis of one or more frames (e.g., a still image) of the video-content object. An audio-recognition model may be trained by machine learning to make a prediction about a video-content object based on an analysis of part or all of the audio of a video-content object (e.g., speech identification, language identification, sound identification, source separation, etc.). A text-recognition module may be trained by machine learning to make a prediction about a video-content object based on text associated with the video-content object (e.g., posts or comments associated with a video-content object posted on an online social network, text metadata associated with the video-content object, topic classification information associated with the video-content object, intent understanding information associated with the video-content object, etc.). In particular embodiments, a prediction about a video-content object may comprise a context, a predicted future action, a predicted object, a predicted motion, or any other suitable prediction. A context of a video-content object may be one or more n-grams that describe the video-content object or an aspect of the video-content object (e.g., a description of objects or actions depicted, a category of the video-content object, etc.). In particular embodiments, a computer-vision platform may update a prediction about a video-content object based on information not used to make a prior prediction (e.g., information received after the prior prediction was made). As an example and not by way of limitation, a video-content object may be a video that is streamed live and information (e.g., likes, comments, shares, video content, etc.) may be received in an ongoing manner and the computer-vision platform may update a prediction based on this information. Although this disclosure may describe a particular video understanding platform, this disclosure contemplates any suitable video understanding platform.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
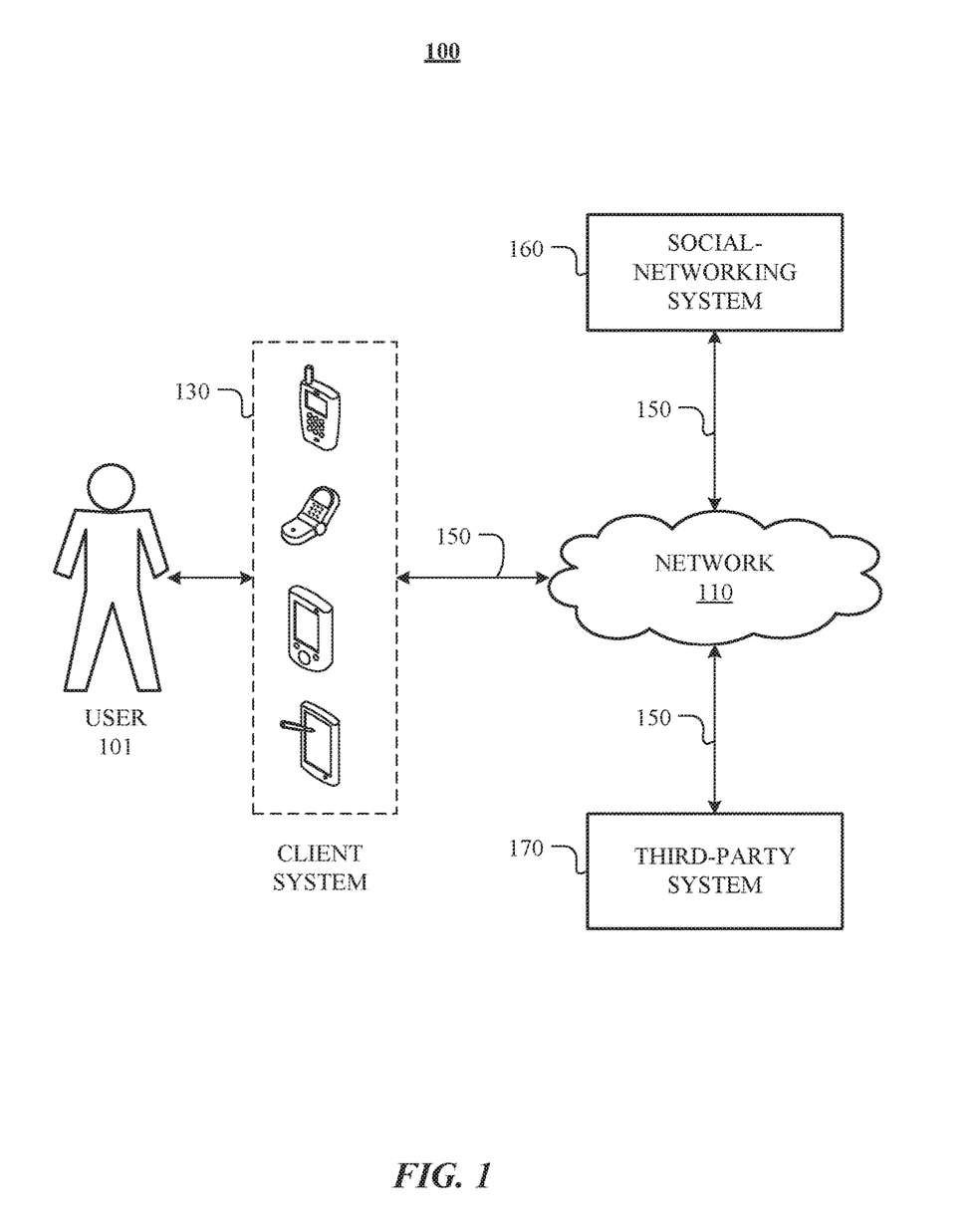
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
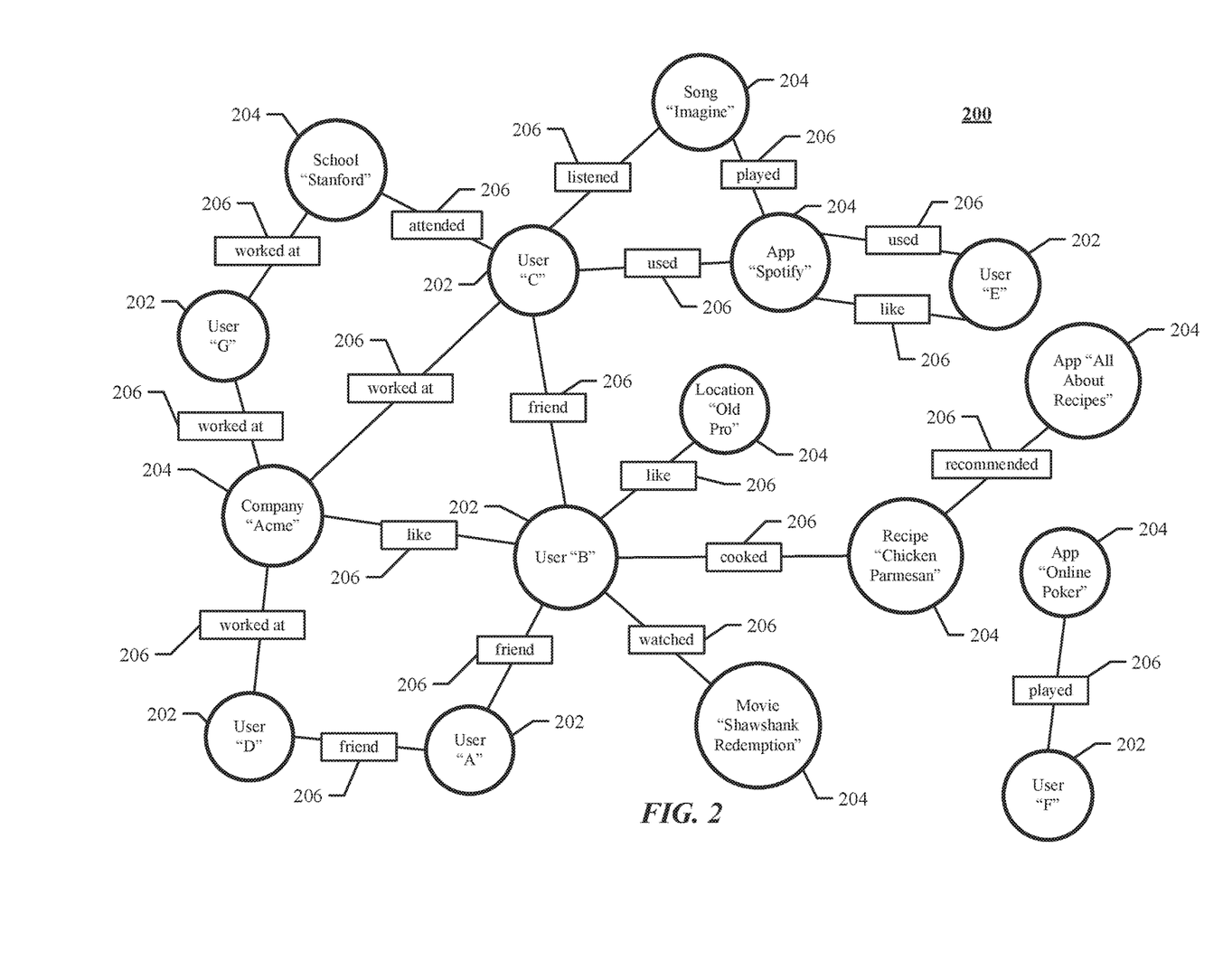
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
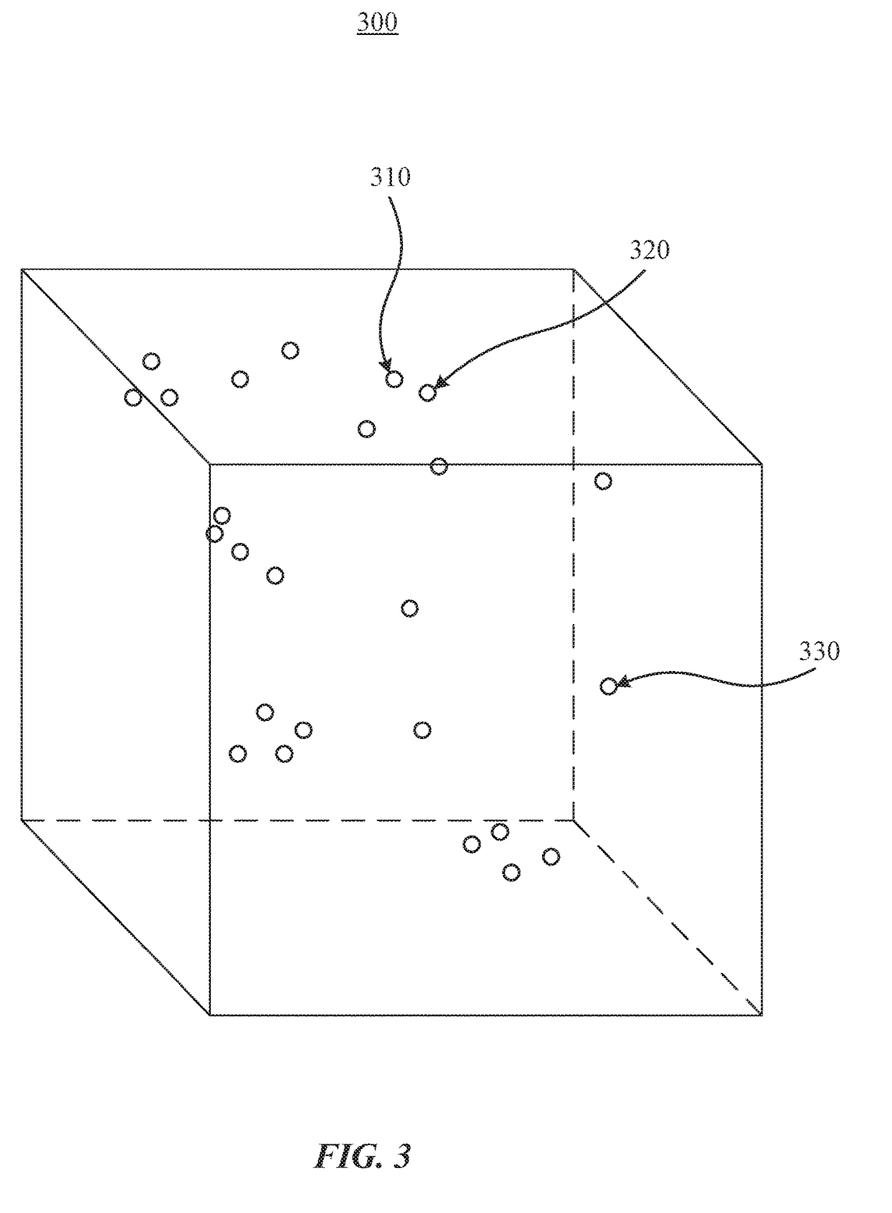
FIG. 3 illustrates an example view of a vector space.

FIG. 3 illustrates an example view of a vector space 300. Vector space 300 may also be referred to as a feature space or an embedding space. In particular embodiments, an object or an n-gram may be represented in a d-dimensional vector space, where d denotes any suitable number of dimensions. An object may represent data, such as audio data or video data. Although the vector space 300 is illustrated as a three-dimensional space, this is for illustrative purposes only, as the vector space 300 may be of any suitable dimension. In particular embodiments, an object may be represented in the vector space 300 as a feature vector. A feature vector may also be referred to as an embedding. Each vector may comprise coordinates corresponding to a particular point in the vector space 300 (i.e., the terminal point of the vector). As an example and not by way of limitation, feature vectors 310, 320, and 330 may be represented as points in the vector space 300, as illustrated in FIG. 3. An object may be mapped to a respective vector representation. As an example and not by way of limitation, objects $t_1$ and $t_2$ may be mapped to feature vectors and in the vector space 300, respectively, by applying a function $\vec{\pi}$. The function $\vec{\pi}$ may map objects to feature vectors by feature extraction, which may start from an initial set of measured data and build derived values (e.g., features). When an object has data that is either too large to be efficiently processed or comprises redundant data, $\vec{\pi}$ may map the object to a feature vector using a transformed reduced set of features (e.g., feature selection). A feature vector may comprise information related to the object. In particular embodiments, an object may be mapped to a feature vector based on one or more properties, attributes, or features of the object, relationships of the object with other objects, or any other suitable information associated with the object. As an example and not by way of limitation, an object comprising a video or an image may be mapped to a vector representation in the vector space 300 by using an algorithm to detect or isolate various desired portions or shapes of the object. Features of the feature vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a feature vector based on features such as a spectral slope, a tonality coefficient, an audio spectrum centroid, an audio spectrum envelope, a Mel-frequency cepstrum, or any other suitable information. In particular embodiments, an n-gram may be mapped to a feature vector by a dictionary trained to map text to a feature vector. As an example and not by way of limitation, a model, such as Word2vec, may be used to map an n-gram to a feature vector. In particular embodiments, feature vectors or embeddings may be robust to basic changes like text addition or changes to aspect ratio. In particular embodiments, social-networking system 160 may map objects of different modalities (e.g., visual, audio, text) to a particular vector space or using a separate function. In particular embodiments, social-networking system 160 may map objects of different modalities to the same vector space or use a function jointly trained to map one or more modalities to a feature vector (e.g., between visual, audio, text). Although this disclosure describes representing a video-content object in a vector space in a particular manner, this disclosure contemplates representing a video-content object in a vector space in any suitable manner.

In particular embodiments, social-networking system 160 may calculate a similarity metric of feature vectors in vector space 300. A similarity metric may be a cosine similarity, a Minkowski distance, a Mahalanobis distance, a Jaccard similarity coefficient, or any other suitable similarity metric. As an example and not by way of limitation, a similarity metric of $\vec{v_1}$ and $\vec{v_1}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_1}$ may be a Euclidean distance $\|\vec{v_1} - \vec{v_2}\|$. A similarity metric of two feature vectors may represent how similar the two objects corresponding to the two feature vectors, respectively, are to one another, as measured by the distance between the two feature vectors in the vector space 300. As an example and not by way of limitation, feature vector 310 and feature vector 320 may correspond to video-content objects that are more similar to one another than the video-content objects corresponding to feature vector 310 and feature vector 330, based on the distance between the respective feature vectors. In particular embodiments, social-networking system 160 may determine a cluster of vector space 300. A cluster may be a set of one or more points corresponding to feature vectors of objects or n-grams in vector space 300, and the objects or n-grams whose feature vectors are in the cluster may belong to the same class or have some semantic relationship to one another. As an example and not by way of limitation, a cluster may correspond to sports-related content and another cluster may correspond to food-related content. Although this disclosure describes calculating similarity metrics in a particular manner, this disclosure contemplates calculating similarity metrics in any suitable manner.

More information on vector spaces, embeddings, feature vectors, and similarity metrics may be found in U.S. patent application Ser. No. 14/949,436, filed 23 Nov. 2015, U.S. patent application Ser. No. 14/981,413, filed 28 Dec. 2015, U.S. patent application Ser. No. 15/286,315, filed 5 Oct. 2016, and U.S. patent application Ser. No. 15/365,789, filed 30 Nov. 2016, each of which is incorporated by reference.

In particular embodiments, a video understanding platform may be trained by machine learning to make a prediction about a video-content object based on one or more of: frames of the video-content object, audio of the video-content object, and text associated with the video-content object. In particular embodiments, a video understanding platform may comprise a video-recognition model, an audio-recognition model, and a text-recognition model. A video-recognition model may be trained by machine learning to make a prediction about a video-content object based on an analysis of one or more frames (e.g., a still image) of the video-content object. An audio-recognition model may be trained by machine learning to make a prediction about a video-content object based on an analysis of part or all of the audio of a video-content object (e.g., speech identification, language identification, sound identification, source separation, etc.). A text-recognition module may be trained by machine learning to make a prediction about a video-content object based on text associated with the video-content object (e.g., posts or comments associated with a video-content object posted on an online social network, text metadata associated with the video-content object, topic classification information associated with the video-content object, intent understanding information associated with the video-content object, etc.). In particular embodiments, a prediction about a video-content object may comprise a context, a predicted future action, a predicted object, a predicted motion, or any other suitable prediction. A context of a video-content object may be one or more n-grams that describe the video-content object or an aspect of the video-content object (e.g., a description of objects or actions depicted, a category of the video-content object, etc.). In particular embodiments, a computer-vision platform may update a prediction about a video-content object based on information not used to make a prior prediction (e.g., information received after the prior prediction was made). As an example and not by way of limitation, a video-content object may be a video that is streamed live and information (e.g., likes, comments, shares, video content, etc.) may be received in an ongoing manner and the computer-vision platform may update a prediction based on this information. Although this disclosure may describe a particular video understanding platform, this disclosure contemplates any suitable video understanding platform.

Figure 4:
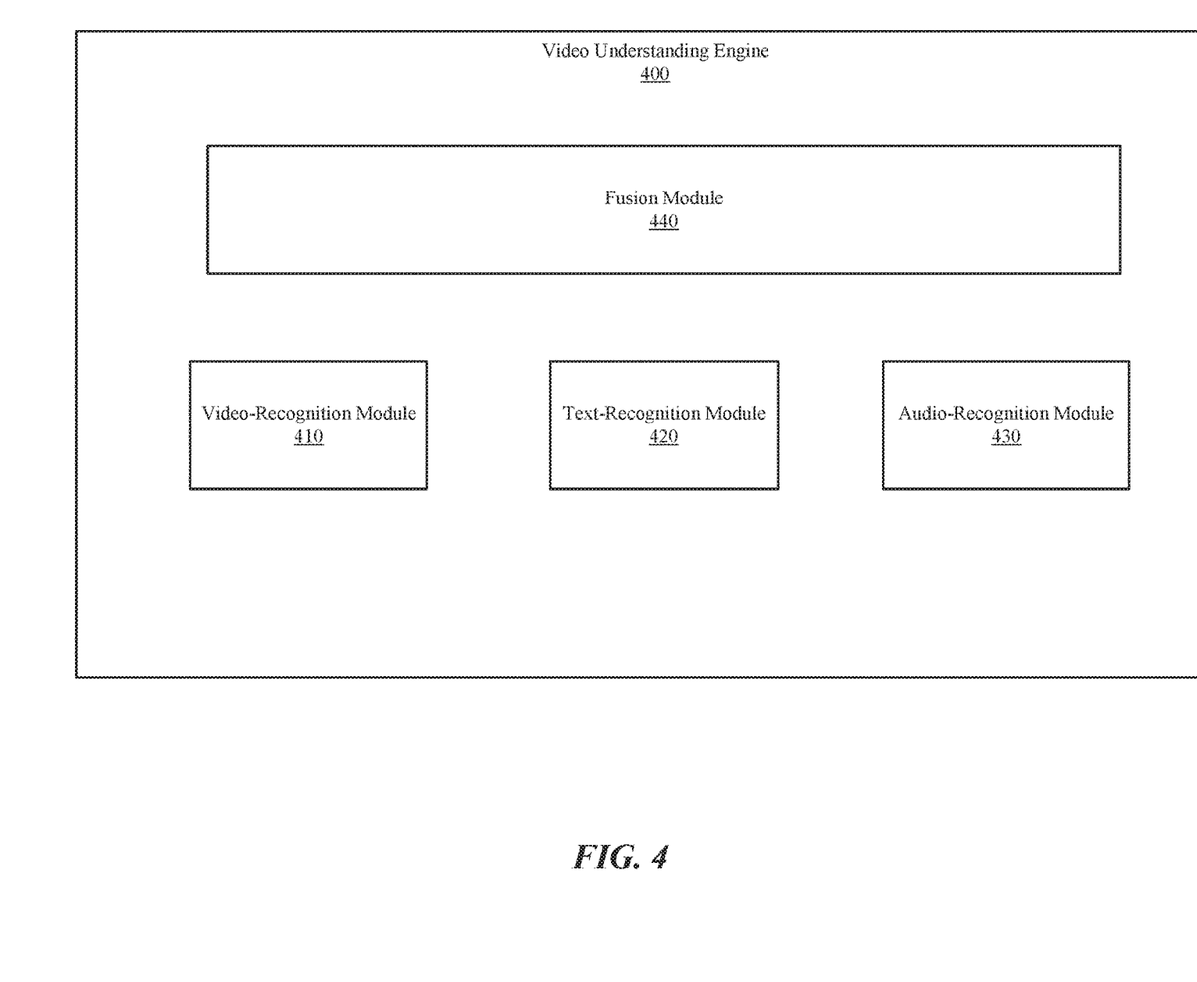
FIG. 4 illustrates an example video understanding engine.

FIG. 4 illustrates an example video understanding engine 400. In particular embodiments, video understanding engine 400 may comprise a video-recognition module 410, a text-recognition module 420, and an audio-recognition module 430. In particular embodiments, video-recognition module 410 may be trained by machine learning to receive a feature vector representing a video-content object based on one or more frames of the video-content object and output a prediction about the video-content object. In particular embodiments, text-recognition module 420 may be trained by machine learning to receive a feature vector representing a video-content object based on text associated with the video-content object and output a prediction about the video-content object. In particular embodiments, audio-recognition module 430 may be trained by machine learning to receive a feature vector representing a video-content object based on one or more portions of audio of the video-content object and output a prediction about the video-content object. Although this disclosure may describe a particular video understanding engine, this disclosure contemplates any suitable video understanding engine.

In particular embodiments, a video-content object may comprise frames and audio. As an example and not by way of limitation, the video-content object may be a video file (e.g., MP4, WMV, AVI, etc.) comprising video data in a video format (e.g., VP9, HEVC/H.265, etc.) and audio data in an audio format (e.g., MP3, AAC, Vorbis, FLAC, Opus, etc.). In particular embodiments, the video-content object may be associated with text. As an example and not by way of limitation, the video-content object may be associated with metadata. The metadata may include information about the production of the video-content object (e.g., the date, location, or author of the video), descriptive information about the video-content object (e.g., a summary of the video-content object, identities of people depicted, background information about an event depicted, why the video-content object was created, etc.), information about the content type (e.g., news report, birthday party, live stream, etc.), keywords associated with the video-content object, technical information about the video-content object (e.g., format, file size, duration, format, etc.), a transcript of the video-content object, or any other suitable metadata. As another example and not by way of limitation, the video-content object may be posted on an online social network and have associated text such as a post or a comment. Although this disclosure may describe a particular video-content object, this disclosure contemplates any suitable video-content object.

In particular embodiments, social-networking system 160 may access a feature vector representing the video-content object based on one or more frames of the video-content object. As an example and not by way of limitation, the feature vector may be determined based on feature extraction of features of the one or more frames. As another example and not by way of limitation, the feature vector of the video-content object may be based on one or more feature vectors of the one or more frames (e.g., pooling the feature vectors). In particular embodiments, the video-content object may correspond to a node in a social graph of the social-networking system 160. In particular embodiments, the video-content object may be stored in a data store (e.g., a social-graph database) and social-networking system 160 may access the feature vector from the data store. In particular embodiments, the social-networking system 160 may access the feature vector by accessing the video-content object and mapping the video-content object to the feature vector. Although this disclosure may describe accessing a feature vector in a particular manner, this disclosure contemplates accessing a feature vector in any suitable particular manner.

In particular embodiments, social-networking system 160 may access a feature vector representing the video-content based on at least some of the text associated with the video-content object. In particular embodiments, the text associated with the video-content object may be a transcript of one or more portions of the audio, metadata associated with the video-content object, or a post by a user of the social-networking system associated with the video-content object. As an example and not by way of limitation, the video-content object may be posted on social-networking system 160, and social-networking system 160 may access a feature vector based on a comment associated with the video-content object posted on the online social network. As another example and not by way of limitation, social-networking system 160 may access a feature vector based on metadata associated with the video-content object that indicates that the video-content object was created by a particular user. In particular embodiments, a feature vector may be based on topic classification information associated with the video-content object. As an example and not by way of limitation, a video-content object may have an associated topic comprising the text "opera" and a feature vector may be based on the text "opera." In particular embodiments, social-networking system 160 may train a language module (e.g., by machine learning) based on the text. A feature vector may be based on the output of a language module. Although this disclosure may describe accessing a feature vector in a particular manner, this disclosure contemplates accessing a feature vector in any suitable particular manner.

In particular embodiments, social-networking system 160 may access a feature vector representing the video-content object based on one or more portions of the audio. As an example and not by way of limitation, the video-content object may comprise a video of a birthday party and the feature vector may be based on a portion of audio where people sing "Happy Birthday to You." As another example and not by way of limitation, the video-content object may comprise a video of a blackbird and a feature vector may be based on a portion of audio where the blackbird vocalizes (i.e., its bird song). In particular embodiments, a feature vector may be based on audio analysis. As an example and not by way of limitation, the feature vector may be based on identification of speech, an identified language of speech, an identified sound (e.g., a dog barking), source separation (e.g., an identified number of speakers, separating different sound sources into separate audio tracks, etc.), or any other suitable information based on audio analysis. Although this disclosure may describe accessing a feature vector in a particular manner, this disclosure contemplates accessing a feature vector in any suitable particular manner.

In particular embodiments, input to fusion module 440 may comprise one or more predictions made by video-recognition module 410, text-recognition module 420, or audio-recognition module 430. As an example and not by way of limitation, a video-content object may depict a boxing match. Video-recognition module 410 may predict that the video-content object depicts boxing based on one or more frames of the video-content object (e.g., by extracting features, such as images of boxers wearing boxing gloves, the boxing ring, the referee, etc.). Text-recognition module 420 may predict that the video-content object depicts a fight based on text associated with the video-content object, such as "fight," "punch," or "knockout." Audio-recognition module 430 may predict that the video-content object depicts a sporting event based on a portion of the audio, such as audio of the crowd cheering or commentary provided by sportscasters. Each of these predictions may be used as an input to fusion module 440. Fusion module 440 may output a prediction (e.g., that the video-content object depicts a boxing match) or a feature vector representing the video-content object. Although this disclosure may describe determining a feature vector in a particular manner, this disclosure contemplates determining a feature vector in any suitable particular manner.

In particular embodiments, one of video-recognition module 410, text-recognition module 420, and audio-recognition module 430 may generate a feature vector based on one or more outputs of another one of video-recognition module 410, text-recognition module 420, and audio-recognition module 430. As an example and not by way of limitation, audio-recognition module 430 may output a predicted transcript of a video-content object. This predicted transcript may comprise text and be used as an input to text-recognition module 420. As another example and not by way of limitation, video-recognition module 410 may generate an intermediate output prediction and the intermediate output prediction may be used as an input to audio-recognition module 430. Although this disclosure may describe particular inputs and outputs, this disclosure contemplates any suitable inputs and outputs.

In particular embodiments, fusion module 440 may be trained to take as inputs one or more of the frames of a video-content object, text associated with the video-content object, and one or more portions of the audio of the video-content object and output a feature vector representing the video-content object based on a combination the inputs. Video understanding engine 440 may comprise a fusion module 440, but not video-recognition module 410, text-recognition module 420, or audio-recognition module 430. Additionally or alternatively, fusion module 440 may output a prediction about the video-content object. In particular embodiments, video understanding engine 400 may comprise one or more of video-recognition module 410, text-recognition module 420, or audio-recognition module 430, fusion module 440, configured in any suitable manner. Although this disclosure may describe a particular video understanding engine, this disclosure contemplates any suitable video understanding engine.

In particular embodiments, video understanding engine 400 may comprise a fusion module 440. Fusion module 440 may be trained by machine learning to make a prediction about the video-content object based on one or more frames of the video-content object, text associated with the video-content object, and one or more portions of audio of the video-content object. In particular embodiments, fusion module 440 may be trained by machine learning to determine a feature vector representing the video-content object based on a combination of a feature vector based on one or more frames of the video-content object, a feature vector based on text associated with the video-content object, and a feature vector based on one or more portions of audio of the video-content object. As an example and not by way of limitation, a video-content object may depict a birthday party. A feature vector based on one or more frames of the video-content object may be input to fusion module 440, which may be based on recognizing objects depicted in the frames, such as a birthday cake or party hats. A feature vector based on text associated with the video-content object, such as posts on an online social network that include the text "Happy Birthday," or the title for the video-content object "My Birthday Party," may be input into fusion module 440. A feature vector based on one or more portions of audio of the video-content object, such as the audio of a group of people depicted in the video-content object singing the Happy Birthday Song, may be input into fusion module 440. Fusion module 440 may output a feature vector representing the video-content object based on a combination of the inputted feature vectors. Although this disclosure may describe determining a feature vector in a particular manner, this disclosure contemplates determining a feature vector in any suitable particular manner.

In particular embodiments, fusion module 440 may determine a context of the video-content object. Fusion module 440 may be trained by machine learning, to determine the context based on a feature vector representing the video-content object, the feature vector being based on a combination of a feature vector based on one or more frames of the video-content object, a feature vector based on at least some of the text associated with he video-content object, and a feature vector based on one or more portions of audio of the video-content object. In particular embodiments, fusion module 440 may determine a context of the video-content object based on social-graph information based at least in part on one or more nodes or edges connected to the node corresponding to the video-content object. As an example and not by way of limitation, a video-content object may be posted on a user's page on an online social network. The user may have posted the video on her birthday, as determined by the user profile of the user. The context may be that the video-content object depicts the user's birthday party, as determined by a feature vector feature vector representing the video-content object and the social-graph information. In particular embodiments, determining a context of a video-content object may comprise recognizing a physical object (e.g., a book), identifying a particular physical object (e.g., the book "Oh, The Places You'll Go!" by Dr. Seuss), detecting a physical object, tracking a physical object, recognizing a pose (e.g., sitting, standing, etc.), recognizing a face, determining a topic (e.g., sports, politics, documentary, etc.), recognizing a scene (e.g., classroom, forest, etc.), recognizing an activity (e.g., throwing a ball, jogging, etc.), recognizing behavior (e.g., laughing, crying, etc.), or recognizing any other information associated with the video-content object. Although this disclosure may describe determining a context of a video-content object in a particular manner, this disclosure contemplates determining a context of a video-content object in any suitable manner.

In particular embodiments, social-networking system 160 may receive a request to access the video-content object from a client device of a user of the social-networking system. In particular embodiments, social-networking system 160 may generate a recommendation for a second video-content object based on the feature vector of the video-content object and a user profile for the user. As an example and not by way of limitation, a user may access a first video-content object depicting a review of a mobile phone. Fusion module 440 may determine a feature vector representing the first video-content object. Further, based on social-graph information, social-networking system 160 may determine that the user is age 23 and likes the company APPLE. Social-networking system 160 may generate a recommendation for a second video-content object that features the APPLE IPHONE based on a similarity metric between the feature vector representing the first video-content object and a feature vector representing the second video-content object, and based on determining that users between the ages of 18 and 25 tend to prefer APPLE IPHONEs to other mobile phones. Social-networking system 160 may send, to the user's client device, the recommendation for the second video-content object. Although this disclosure may describe recommending a video-content object in a particular manner, this disclosure contemplates recommending a video-content object in any suitable manner.

In particular embodiments, determining the context of the video-content object may comprise determining that the video-content object is inappropriate. As an example and not by way of limitation, fusion module 440 may output a prediction that a video-content object depicts nudity or sexual content, violent or graphic content, hateful content (e.g., promotes or condones violence against individuals or groups), fraudulent or misleading content (e.g., a pyramid scheme), harmful or dangerous content (e.g., encourages others to do harmful activities), threatening material, or material that violates copyright law. In particular embodiments, social-networking system 160 may remove a second video-content object based on determining that the video-content object and the second video-content object are similar based on the feature vector for the video-content object and a feature vector for the second video-content object. As an example and not by way of limitation, fusion module 440 may determine that a video-content object depicts material that depicts violent content. Social-networking system 160 may determine that a second video-content object is similar to the video-content object based on a cosine similarity between a feature vector representing the video-content object and a feature vector representing the second video-content object. Based on determining that the second video-content object is similar to the video-content object, social-networking system 160 may remove the second video-content object. Although this disclosure may describe determining that the video-content object is inappropriate and removing a video-content object in a particular manner, this disclosure contemplates determining that the video-content object is inappropriate and removing a video-content object in any suitable manner.

In particular embodiments, social-networking system 160 may receive, a query associated with the video-content object from a client device of a user of the social-networking system. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The query may comprise a plurality of n-grams. As an example and not by way of limitation, the querying user may have inputted the query "cats afraid of cucumbers." Although this disclosure describes receiving a query in a particular manner, this disclosure contemplates receiving a query in any suitable manner.

In particular embodiments, social-networking system 160 may identify one or more objects matching the query. Social-networking system 160 may search a data store (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. Although this disclosure describes identifying objects matching a query in a particular manner, this disclosure contemplates identifying objects matching a query in any suitable manner.

In particular embodiments, social-networking system 160 may, for each identified objects, access a feature vector representing the identified object. Social-networking system 160 may map objects to feature vectors by feature extraction, or access a cached feature vector for an object that has been previously mapped. In particular embodiments, social-networking system 160 may rank each identified object based on a similarity metric between the feature vector representing the video-content object and the feature vector representing the identified object. As an example and not by way of limitation, the similarity metric may be a cosine similarity between the feature vector representing the video-content object and the feature vector representing the identified object. The objects may be ranked higher if the cosine similarity associated with the object is larger. In particular embodiments, social-networking system 160 may send, to the client system in response to the query, one or more search results corresponding to one or more of the identified objects, respectively, each identified object corresponding to a search result having a rank greater than a threshold rank. As an example and not by way of limitation, a threshold rank may be a static number (e.g., 0.8). As another example and not by way of limitation, a threshold rank may be determined such that a particular number of search results are sent to the user (e.g., the threshold rank may be determined such that 50 search results corresponding to the top-ranked identified objects have a rank greater than the threshold rank). Although this disclosure describes ranking and sending objects in a particular manner, this disclosure contemplates ranking and sending objects in any suitable manner.

Figure 5:
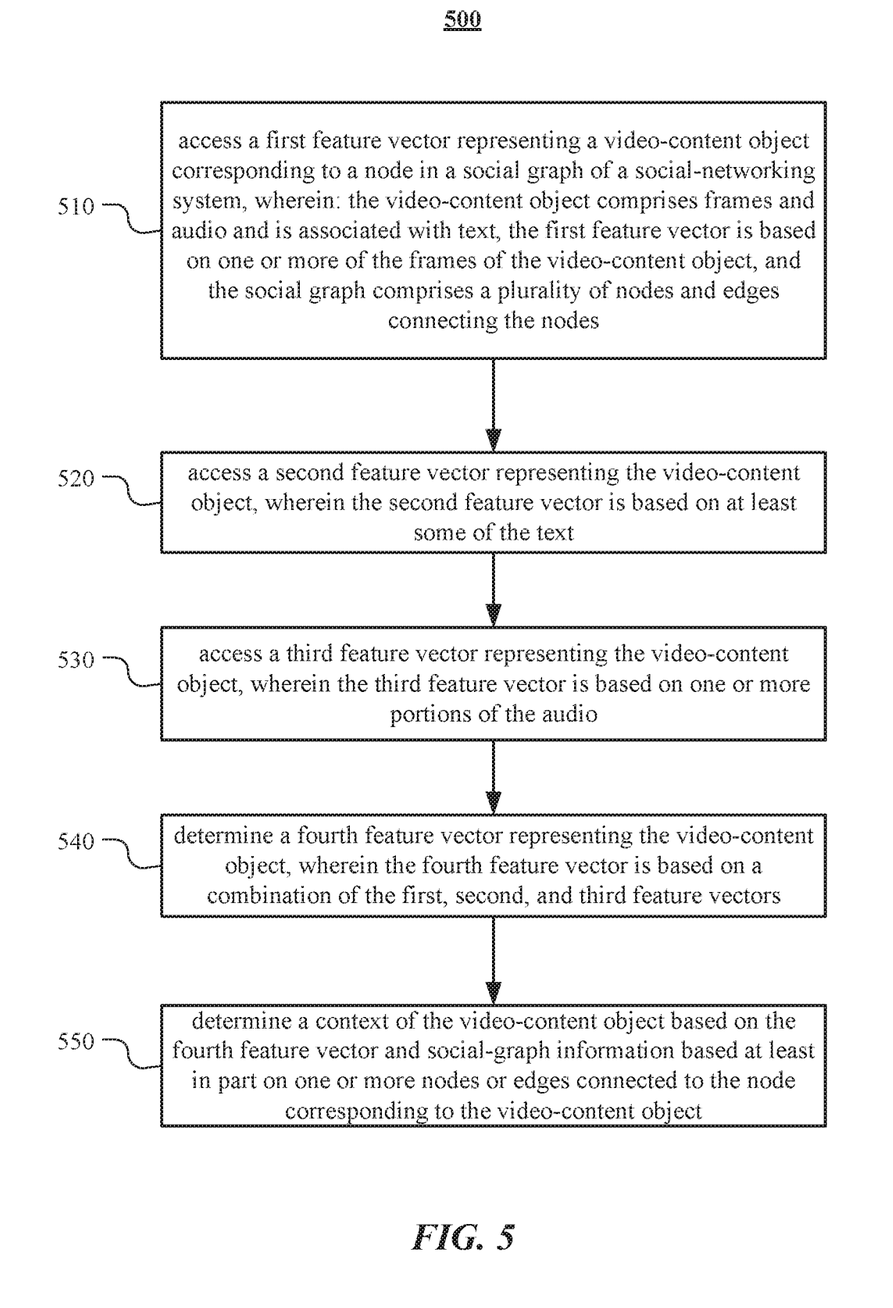
FIG. 5 illustrates an example method for determining a context of a video-content object.

FIG. 5 illustrates an example method 500 for determining a context of a video-content object. The method may begin at step 510, where social-networking system 160 may access a first feature vector representing a video-content object corresponding to a node in a social graph of a social-networking system, wherein: the video-content object comprises frames and audio and is associated with text, and the first feature vector is based on one or more of the frames of the video-content object, and the social graph comprises a plurality of nodes and edges connecting the nodes. At step 520, social-networking system 160 may access a second feature vector representing the video-content object, wherein the second feature vector is based on at least some of the text. At step 530, social-networking system 160 may access a third feature vector representing the video-content object, wherein the third feature vector is based on one or more portions of the audio. At step 540, social-networking system 160 may determine a fourth feature vector representing the video-content object, wherein the fourth feature vector is based on a combination of the first, second, and third feature vectors. At step 550, social-networking system 160 may determine a context of the video-content object based on the fourth feature vector and social-graph information based at least in part on one or more nodes or edges connected to the node corresponding to the video-content object. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for determining a context of a video-content object including the particular steps of the method of FIG. 5, this disclosure contemplates any suitable method for determining a context of a video-content object including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
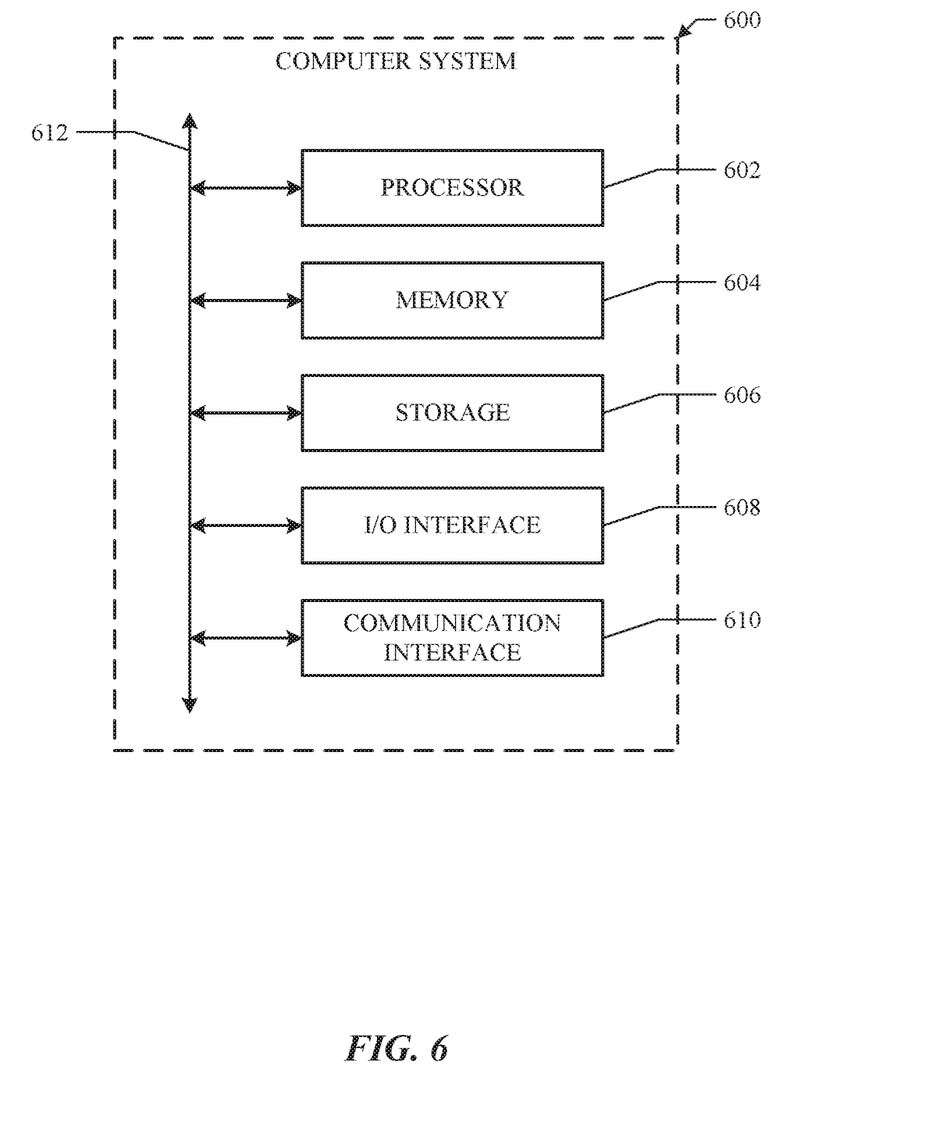
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface. [51] In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computing devices, accessing a first feature vector representing a video-content object corresponding to a node in a social graph of a social-networking system, wherein:
     the video-content object comprises frames and audio and is associated with text;
     the first feature vector is based on one or more of the frames of the video-content object; and
     the social graph comprises a plurality of nodes and edges connecting the nodes;
   by one or more computing devices, accessing a second feature vector representing the video-content object, wherein the second feature vector is based on at least some of the text;
   by one or more computing devices, accessing a third feature vector representing the video-content object, wherein the third feature vector is based on one or more portions of the audio;
   by one or more computing devices, determining a fourth feature vector representing the video-content object, wherein the fourth feature vector is based on a combination of the first, second, and third feature vectors; and
   by one or more computing devices, determining a context of the video-content object based on the fourth feature vector and social-graph information based at least in part on one or more nodes or edges connected to the node corresponding to the video-content object.

2. The method of claim 1, wherein the text associated with the video-content object comprises one or more of:
   a transcript of one or more portions of the audio;
   metadata associated with the video-content object; or
   a post by a user of the social-networking system associated with the video-content object.

3. The method of claim 1, further comprising:
   by one or more computing devices, receiving a request to access the video-content object from a client device of a user of the social-networking system;
   by one or more computing devices, generating a recommendation for a second video-content object based on the feature vector of the video-content object and a user profile for the user; and
   by one or more computing devices, sending, to the client device, the recommendation.

4. The method of claim 1, wherein determining a context of the video-content object comprises one or more of:
   recognizing a physical object;
   identifying a particular physical object;
   detecting a physical object;
   tracking a physical object;

recognizing a pose;
recognizing a face;
determining a topic;
recognizing a scene;
recognizing an activity; or
recognizing behavior.

5. The method of claim 1, further comprising, by one or more computing devices, removing a second video-content object based on determining that the video-content object and the second video-content object are similar based on the feature vector for the video-content object and a feature vector for the second video-content object, wherein determining the context of the video-content object comprises determining that the video-content object is inappropriate.

6. The method of claim 1, further comprising:
by one or more computing devices, receiving, a query associated with the video-content object from a client device of a user of the social-networking system;
by one or more computing devices, identifying one or more objects matching the query;
by one or more computing devices, for each identified object, accessing a feature vector representing the identified object;
by one or more computing devices, ranking each identified object based on a similarity metric between the feature vector representing the video-content object and the feature vector representing the identified object; and
by one or more computing devices, sending, to the client system in response to the query, one or more search results corresponding to one or more of the identified objects, respectively, each identified object corresponding to a search result having a rank greater than a threshold rank.

7. The method of claim 1, wherein the text associated with the first video-content object comprises text output of an audio-recognition module.

8. One or more computer-readable non-transitory storage media embodying software that is operable when executed to:
access a first feature vector representing a video-content object corresponding to a node in a social graph of a social-networking system, wherein:
the video-content object comprises frames and audio and is associated with text;
the first feature vector is based on one or more of the frames of the video-content object; and
the social graph comprises a plurality of nodes and edges connecting the nodes;
access a second feature vector representing the video-content object, wherein the second feature vector is based on at least some of the text;
access a third feature vector representing the video-content object, wherein the third feature vector is based on one or more portions of the audio;
determine a fourth feature vector representing the video-content object, wherein the fourth feature vector is based on a combination of the first, second, and third feature vectors; and
determine a context of the video-content object based on the fourth feature vector and social-graph information based at least in part on one or more nodes or edges connected to the node corresponding to the video-content object.

9. The media of claim 8, wherein the text associated with the video-content object comprises one or more of:
a transcript of one or more portions of the audio;
metadata associated with the video-content object; or
a post by a user of the social-networking system associated with the video-content object.

10. The media of claim 8, wherein the software is further operable when executed to:
receive a request to access the video-content object from a client device of a user of the social-networking system;
generate a recommendation for a second video-content object based on the feature vector of the video-content object and a user profile for the user; and
send, to the client device, the recommendation.

11. The media of claim 8, wherein determining a context of the video-content object comprises one or more of:
recognizing a physical object;
identifying a particular physical object;
detecting a physical object;
tracking a physical object;
recognizing a pose;
recognizing a face;
determining a topic;
recognizing a scene;
recognizing an activity; or
recognizing behavior.

12. The media of claim 8, wherein the software is further operable when executed to remove a second video-content object based on determining that the video-content object and the second video-content object are similar based on the feature vector for the video-content object and a feature vector for the second video-content object, wherein determining the context of the video-content object comprises determining that the video-content object is inappropriate.

13. The media of claim 8, wherein the software is further operable when executed to:
receive, a query associated with the video-content object from a client device of a user of the social-networking system;
identify one or more objects matching the query;
for each identified object, access a feature vector representing the identified object;
rank each identified object based on a similarity metric between the feature vector representing the video-content object and the feature vector representing the identified object; and
send, to the client system in response to the query, one or more search results corresponding to one or more of the identified objects, respectively, each identified object corresponding to a search result having a rank greater than a threshold rank.

14. The media of claim 8, wherein the text associated with the first video-content object comprises text output of an audio-recognition module.

15. A system comprising:
one or more processors; and
a memory coupled to the processors and comprising instructions operable when executed by the processors to cause the processors to:
access a first feature vector representing a video-content object corresponding to a node in a social graph of a social-networking system, wherein:
the video-content object comprises frames and audio and is associated with text;
the first feature vector is based on one or more of the frames of the video-content object; and
the social graph comprises a plurality of nodes and edges connecting the nodes;

access a second feature vector representing the video-content object, wherein the second feature vector is based on at least some of the text;

access a third feature vector representing the video-content object, wherein the third feature vector is based on one or more portions of the audio;

determine a fourth feature vector representing the video-content object, wherein the fourth feature vector is based on a combination of the first, second, and third feature vectors; and determine a context of the video-content object based on the fourth feature vector and social-graph information based at least in part on one or more nodes or edges connected to the node corresponding to the video-content object.

16. The system of claim 15, wherein the text associated with the video-content object comprises one or more of:

a transcript of one or more portions of the audio;

metadata associated with the video-content object; or a post by a user of the social-networking system associated with the video-content object.

17. The system of claim 15, wherein the processors are further operable when executing the instructions to:

receive a request to access the video-content object from a client device of a user of the social-networking system;

generate a recommendation for a second video-content object based on the feature vector of the video-content object and a user profile for the user; and send, to the client device, the recommendation.

18. The system of claim 15, wherein determining a context of the video-content object comprises one or more of:

recognizing a physical object;
identifying a particular physical object;
detecting a physical object;
tracking a physical object;
recognizing a pose;
recognizing a face;
determining a topic;
recognizing a scene;
recognizing an activity; or
recognizing behavior.

19. The system of claim 15, wherein the processors are further operable when executing the instructions to remove a second video-content object based on determining that the video-content object and the second video-content object are similar based on the feature vector for the video-content object and a feature vector for the second video-content object, wherein determining the context of the video-content object comprises determining that the video-content object is inappropriate.

20. The system of claim 15, wherein the processors are further operable when executing the instructions to:

receive, a query associated with the video-content object from a client device of a user of the social-networking system;

identify one or more objects matching the query;

for each identified object, access a feature vector representing the identified object;

rank each identified object based on a similarity metric between the feature vector representing the video-content object and the feature vector representing the identified object; and send, to the client system in response to the query, one or more search results corresponding to one or more of the identified objects, respectively, each identified object corresponding to a search result having a rank greater than a threshold rank.

* * * * *